United States Patent [19]
Stewart et al.

[11] Patent Number: 6,118,089
[45] Date of Patent: Sep. 12, 2000

[54] MODULAR STEERING COLUMN SWITCH WITH SELECTABLE SWITCHING FUNCTIONS

[75] Inventors: Trevor Stewart, Rielasingen-Worblingen; Ernst Hafner, Hagnau; Wolfgang Huber, Wahlwies, all of Germany

[73] Assignee: TRW Automotive Electronics & Components GmbH & Co, KG, Germany

[21] Appl. No.: 08/982,551

[22] Filed: Dec. 2, 1997

[30] Foreign Application Priority Data

Dec. 2, 1997 [DE] Germany ............................ 196 49 912

[51] Int. Cl.⁷ .................................................. H01H 9/02
[52] U.S. Cl. .................................. 200/61.28; 200/61.54; 200/335
[58] Field of Search .............. 200/4, 17 R, 61.27–61.38, 200/61.54, 61.88, 332, 335

[56] References Cited

U.S. PATENT DOCUMENTS

| | | | |
|---|---|---|---|
| 4,277,658 | 7/1981 | Delp et al. | 200/61.54 |
| 4,404,438 | 9/1983 | Honjo | 200/61.54 |
| 4,423,295 | 12/1983 | Contato | 200/61.27 |
| 4,739,130 | 4/1988 | Roller et al. | 200/61.27 |
| 4,888,456 | 12/1989 | Suzuki | 200/61.27 |
| 5,606,156 | 2/1997 | Mahr et al. | 200/61.54 |

FOREIGN PATENT DOCUMENTS

| | | | |
|---|---|---|---|
| 0 645 280 | 3/1995 | European Pat. Off. | B60Q 1/14 |
| 2 749 240 | 12/1997 | France | B60Q 1/34 |
| 196 27 767 | 1/1998 | Germany | H01H 9/08 |

*Primary Examiner*—Michael Friedhofer
*Attorney, Agent, or Firm*—Fay, Sharpe, Fagan, Minnich & McKee, LLP

[57] ABSTRACT

A steering column switch unit (1) includes a housing (3) in which at least one operating lever (9) is tiltably and/or displaceably retained, for which, during installation, different operating lever types with respective contact device are installable, whereby the steering column switch unit (1) in housing (3) has a reverse contact device with a pre-defined maximum number of switching functions, and whereby the employed choice of switching functions depends upon the type of the installable operating lever (9) and its contact device.

20 Claims, 3 Drawing Sheets

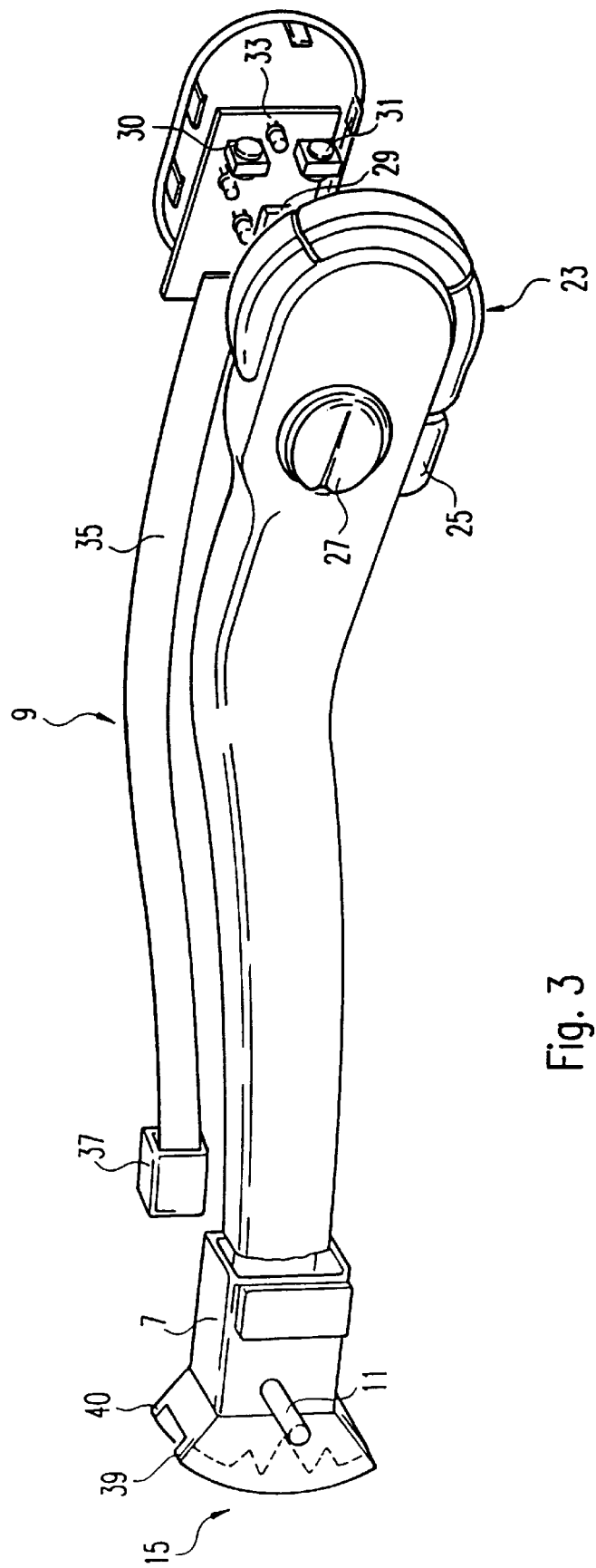

MODULAR STEERING COLUMN SWITCH WITH SELECTABLE SWITCHING FUNCTIONS

BACKGROUND OF THE INVENTION

The invention concerns a steering column switch with a housing, in which at least one operating lever is slewably and/or displaceably retained.

Steering column units of this type are customarily used in autmotive vehicles for operation or activation of light, window wiper, turn signal and similar.

The to be controlled functions, such as for example additional rear window wiper, interval circuits etc. depend upon type of vehicle and equipment. Since the consumer, for reasons of operating ease, cannot be expected to put up with idle switching positions, the steering column switching units had to be adapted to the respectively existing operating scope. This individual adjustment was done, for example, by means of exchange of contacts, flat pieces, etc. and thus required different construction of the major component of the steering column switching unit.

The present invention is therefore based on the object of creating a reasonably priced steering column switch unit, which comprises a multitude of functional- and application possibilities and, concurrently, offers high user convenience.

BRIEF SUMMARY OF THE INVENTION

The object is solved according to the invention by providing a steering column switch unit having a housing into which at least one operating lever is tiltably and/or displaceably retained. During assembly of the steering column switch unit, different operating lever types are installable with respective contact devices associated therewith. The housing in turn has a reverse contact device with a pre-defined maximum number of switching functions whereby the utilized selections of switching functions depends on the type of installable operating lever and their respective contact devices.

By means of the modular construction of a steering column switch unit, which, based upon application profile, differs only by differently mounted activation lever types, manufacturing costs can be significantly lowered as a result of the, except for the activation lever, constant design. However, in order to nevertheless cover all application possibilities, the steering column switch unit includes in the housing a reverse contact device, by means of which provision is made for all potential switching functions. The steering column switch unit installed in different vehicle types and, based upon equipment, thus only still differs in that it has different activation levers, which, depending upon type and equipment guaranty a consumer-friendly selection from the entire functional scope.

In a preferred embodiment of the invention, the mechanical operation of the lever path can also be adapted to the respective vehicle type. Thus, for example, the usual interaction between stop element and stop curve can be defined by means of added stops, which are located at the terminal region of the lever installed in the housing, the lever path [limited] along the stop curve to a pre-definable region, and also to a movement cross-wise to the stop curve. In this fashion, the operating lever can, for example, be made secure from any pull-out, from any movement towards or away from the operator by stops arranged at the different levers. Thus, in vehicles with less extensive functions, for example, without a rear window wiper, no undesirably long lever paths or idle positions are created.

Potentially lacking functions of the radial positions or positions of the operating lever, such as for example lacking interval circuit of a window wiper or lacking additional stages, can be compensated for, in a consumer-friendly manner, by limitation, to a given range of the stop curve, by at least one limit stop.

An otherwise identically designed steering column switch unit can be kept particularly variable if the stop curve at the lever end and the corresponding stop element is located in the housing in fixed manner. With this arrangement, the added possibility is afforded of limitation by stops, to change via simple exchange of an operating lever the entire stop curve characteristic. In such an arrangement, stop curve and stop element can also be located at the end of the lever whereby the entire bearing mechanism is designed at the end of the lever, and, after installation, one component, i.e. stop curve or stop element, is connected in fixed manner with the housing.

In a preferred embodiment of the invention, the operating lever has, preferably in its terminal region, an additional switching device. Said switching device, which consists, for example, of switches with two or more positions, potentiometers, etc. is connected via a connection line with a contact plug located at the installation end of the operating lever. Said contact plug can then be connected in the housing with a connection device, which fully comprises the maximum number of possible tie-ins. Thus, not only can operation levers with different switch devices be connected with the same tie-in device, but also operating levers with identical switch devices can be connected to different tie-ins of the connection device. A multitude of different functional possibilities can thus be beneficially realized.

The contact device and the corresponding reverse contact device, which serve for position registration of the operating lever, can be designed in the steering column switch unit according to the invention like customary electro-mechanical or electrical contacts. The state of the art provides for a multitude of realization possibilities like closing and opening of electrical contacts, conductor tracks, activation of switches and similar.

In the preferred embodiment of the invention, the contact device is designed as at least one magnet and the corresponding reverse contact device as at least one Hall-sensor. Said variation beneficially functions without mechanical friction, free from wear and tear.

In another embodiment of the invention, the steering column switch unit comprises in its housing an evaluation unit with pre-defined maximum operating range for transformation of signals, contacts and/or switch devices into control signals for corresponding vehicle functions. On this type of evaluation device, different signals can, for example, be linked with each other. It is also conceivable to house thereon the conversion of analog signals into control signals such as, for example, the Hall-sensor values or the resistance values of switches, rotary switches and potentiometers, for example for a window wiper motor.

For the realization of these electronic tasks, the evaluation unit may be hard-wired or constructed of programmable logic units, whereby the use of even a micro-processor with firmware is conceivable.

Selection of the complete functional range of the evaluation unit with respect to the invention can, in turn, be influenced by the respectively installed lever. The already described possibility of differing contact device, connection device as well as mechanical movement characteristic can hereby serve in selecting a certain total functional range of the evaluation unit. It is, however, also conceivable to also arrange at or in the lever an identification, which interacts as additional mechanical, electrical or electronic contact with a corresponding reverse contact in the housing and selects, in this manner, the functional scope of the evaluation unit. To that end, it is also conceivable to affix in or at the lever an electronic chip, similar to a phone card chip, which serves, via the connection device or an electronic scanning device for selecting the functional scope of the evaluation unit.

By the present invention, manufacturing costs of the except for the operating lever unchanging unit can be significantly lowered through mass production without limiting user comfort. Different operating levers can be beneficially employed by means of standardized mechanical and electrical connection devices during installation in the remaining part of the steering column switch unit. It is hereby even possible, by means of automatic recognition with respect as to which type of lever was installed, to precisely define the accurate function of the steering column switch unit during production of the levers.

Further specific embodiments of the invention become apparent from the sub-claims.

BRIEF DESCRIPTION OF THE DRAWINGS

In the following, the invention is explained in more detail based on an embodiment represented in the drawing. The drawing depicts in FIG. 1 a cross-section view of a steering column switch unit with installed operating lever.

DETAILED DESCRIPTION OF THE PREFERRED EMBODIMENTS

Figure 1:
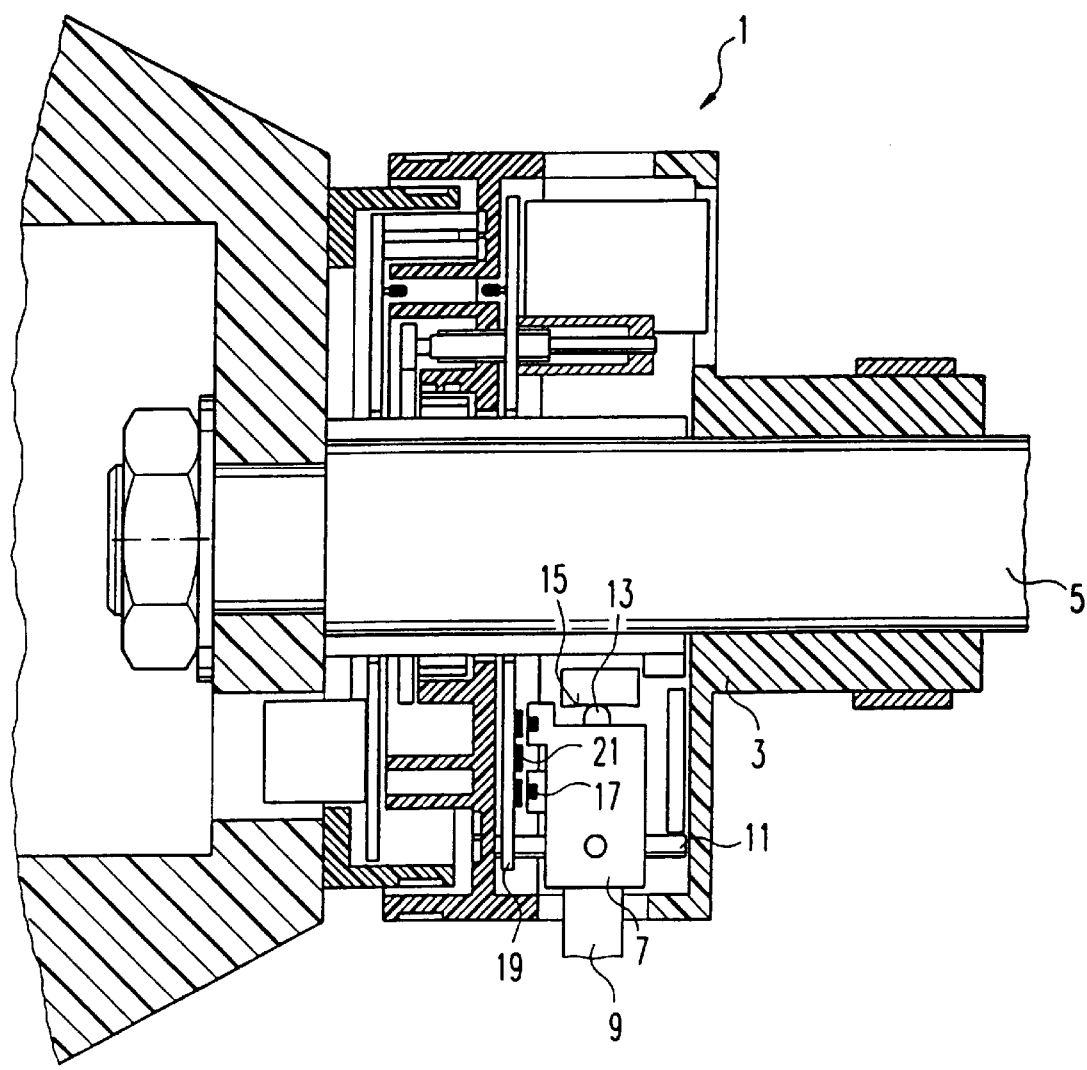

Known steering column switch units customarily comprise two or three operating levers for different functions, such as for indicator lights and flasher lights, window wiper functions and, perhaps, illumination. The steering column switch unit 1, represented schematically in FIG. 1, comprises a housing 3, which concentrically envelops a steering post 5 of a motor vehicle. In the interior of the housing 3 is represented a head 7 of a single engaging operating lever 9, without going more specifically into further details of any other possibly existing operating levers. The following explanations regarding an operating lever 9 therefore apply with respect to such additional levers.

The operating lever, arranged cross-wise vis-a-vis the longitudinal axis of the steering column 5 is tiltably supported, via an axis 11, arranged paraxially relative to the longitudinal axis, in known, not more closely represented fashion, in housing 3 in a plane vertical vis-a-vis the longitudinal axis of the steering column 5. Three-dimensional bearing devices, employed for this purpose, which permit cross- and longitudinal tilting as well as out-pulling and in-pushing of the operating lever are well known in the state of the art and are represented here, since not essential to the invention, only schematically by means of bearing of axis 11.

Operating lever 9 has, at the frontal end of its head, a stop element 13, which is, in not more closely represented manner, stressed with a force in the direction of a stop curve 15, for example by means of a pressure spring arranged in head 7. Head 7 of the operating lever 9 has at a lateral wall, magnets 17 (for example 2) positioned vertically vis-a-vis axis 11. These magnets 17, as represented in FIG. 1, can be arranged at varying distances vis-a-vis axis 11, whereby, of course, magnets 17 may also be arranged next to each other at the same distance from axis 11, along the same circumferential line.

Opposite magnets 17, on the side wall of head 7, there are located in the interior of housing 3, Hall-sensors 21 on a flat piece 19, co-planar and at a distance to the side wall, so that a small space remains between the Hall-sensors 21 and the magnets 17. The Hall-sensors 19 have already been adjusted in number and position (in example three) to all contemplated operating lever types with varying movement characteristics and their differently positioned magnets 17. In the example schematically represented in FIG. 1 there are located on flat piece 19, at different radial distances vis-a-vis axis 11, three Hall-sensors 21, which may, however, in a plane vertical to the drawing plane, be arranged laterally staggered. Needless to say, several Hall-sensors 21 may also be arranged next to each other in this plane on the same circumferential line.

By providing a previously defined maximum number of Hall-sensor positions, it is possible to install different operating levers 9 for different functions without exchange of flat piece 19.

The movement characteristic of an operating lever 9 depends hereby upon the interaction between a stop curve 15 and a stop element 13, as well as upon possible mechanical stops. In such arrangement, one component of the interacting components is respectively arranged stationary in housing 3, and its complementary component at the head 7 of the operating lever 9.

In FIG. 1, shown schematically, the stop element 13 is for example, located at head 7 of the operating lever 9 and its complementary component, i.e. the concave stop curve 15, stationary in the interior of housing 3. Of course, the kinematic reverse is also possible, whereby the stop element 13 is then arranged in the interior of housing 3 and the stop curve 15 convex at the frontal side of head 7 of the operating lever 9 (embodiment according to FIG. 3).

Figure 2:
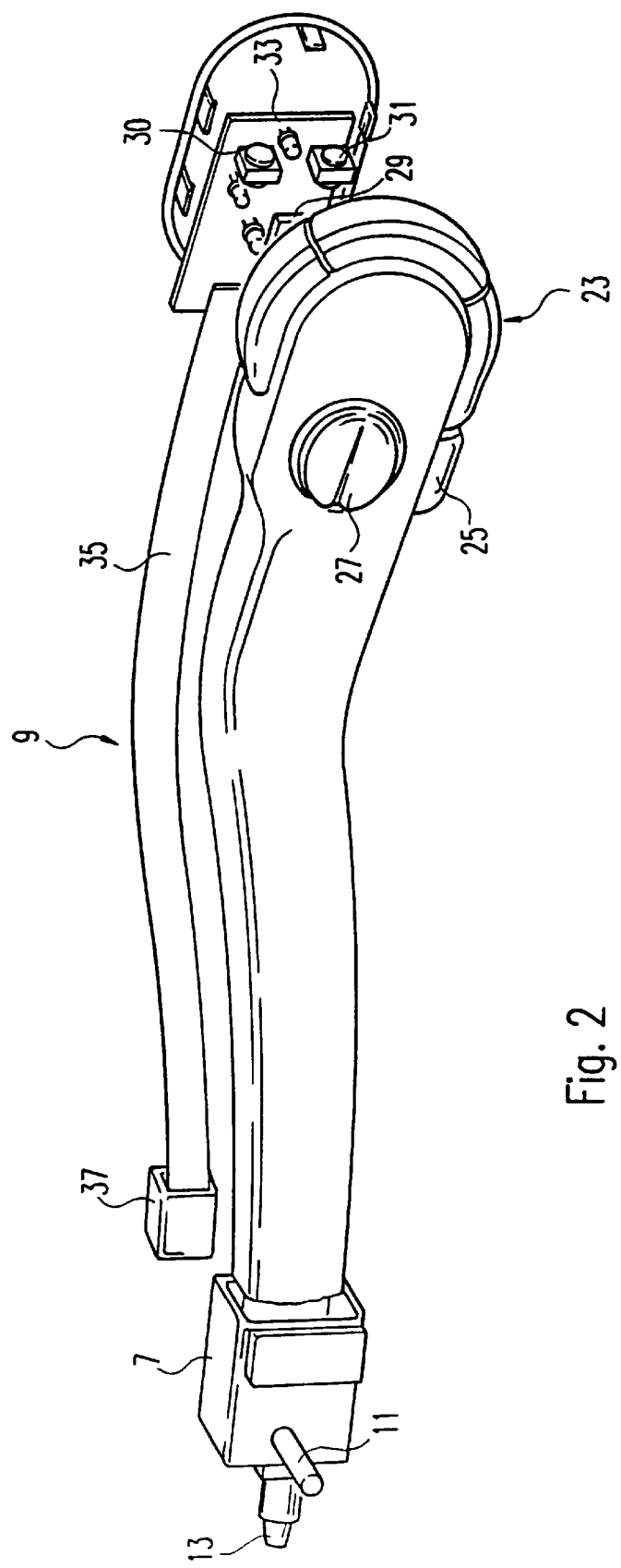
FIG. 2 an exploded drawing in perspective view of an operating lever according to FIG. 1 before installation and FIG. 3 an exploded drawing in perspective view of another specific embodiment of an operating lever.

FIG. 2 depicts in an exploded drawing the operating lever 9 as non-installed single component. The end of the operating lever 9 positioned opposite head 7 is designed as enlarged grip region 23, on which can be arranged activation elements. In FIG. 2 are arranged, for example, at the underside of the grip region 23, a push switch 25 and at the anterior side a toggle switch 27.

By operating the push switch 25, a contact 29 is closed and opened and by operating toggle switch 27, contacts 30 and 31 are closed and opened via a not represented mechanism. These contacts 29, 30, 31 are arranged, for that purpose, on a flat piece 33, located in the interior of grip region 23 of the operating lever 9.

The contacts 29, 30, 31 are electrically connected via a connection line 35, which extends inside the operating lever 9, with a plug 37, or its not represented contact pins.

During the installation of the steering column switch unit 1, said plug 37 is plugged into a connection device located on the flat piece 19 or connected with it. The connection device not shown in FIG. 1 can be designed, for example as universal coupling, whereby same already holds available all contacts for the most diverse lever types. The complementary plug 37 can then correspond in its exterior dimensions precisely to the interior dimensions of the connection device, so that installation-simplifying, standardized connection is guaranteed. In this case, the different operating lever types have plugs 37 of identical dimensions, whereby not all contact pins need then be occupied or present. It is, however, also conceivable to design the connection device in form of several connection couplings, whereby a different functional scope can be then chosen, depending upon into which connection coupling plug 37 is plugged in.

The operating lever 9, depicted in FIG. 3, points out the possibility of designing the head 7 of the operating lever 9 frontally as convex stop curve 15. Needless to say, as described above, the stop element 13 must then be arranged accordingly in the interior of housing 3. The stop curve 15 has two laterial walls 39, 40 which, in cooperation with the stop element 13 prevent any movement cross-wise vis-a-vis the radial movement along the stop curve 15. Such a lever with lateral walls 39, 40 serving as stop could, for example, find application as window wiper operating lever in vehicles without rear window wiper and avoid, in this manner, unwelcome mechanical idle positions. Furthermore, the under and upper side of head 7 of the operating lever 9, in cooperation with the for said purpose complementary components in or at housing 3, can serve as stop for limiting the lever path along the stop curve 15.

On the flat piece 19 (in FIG. 1), there may also be located, in unrepresented fashion, electronics, which not only transmits the individual contact conditions and Hall-sensor values, but also analyzes, interconnects and processes them. It is thus, for example, conceivable that switches arranged in grip region 23 transmit analog signals in form of varying resistance values, which must first be converted into control signals by means of electronic logic. The exact function selection of such evaluation unit, which basically makes available the maximum number of needed functions or signal processings, can, in turn, then be selected based upon employed lever type. It is, for example, conceivable to affix on the flat piece 35, within the operating lever 9, a circuit, which is in communication via connection line 35 with the electronics on the flat piece 19. In this manner, a certain lever type could be electronically recognized and, in addition, also influence the scope of function or the processing of signals for variation in contact seizure and mechanical movement characteristic.

It is claimed:

1. A steering column switch unit comprising:
   at least one operating lever;
   a housing adapted to receive an installation end of the at least one operating lever;
   a contact device associated with the at least one operating lever; and,
   a reverse contact device associated with the housing and defining a maximum number of switching functions of the steering column switch unit, whereby a utilized selection of the switching functions is determined by said contact device associated with the at least one operating lever received in the housing.

2. The steering column unit according to claim 1, wherein: said housing includes a portion defining a stop curve; and, the installation end of the at least one operating lever includes a stop element engagable with the stop curve to limit movement of the installation end along said stop curve to a predefined region and against a movement cross-wise to the stop curve.

3. The steering column switch unit (1) according to claim 1, wherein the installation end of the at least one operating lever includes a portion defining a stop curve is arranged to interact with a stop element associated with said housing.

4. The steering column switch unit according to claim 3, wherein the installation end of the at least one operating lever includes at least one stop, adapted to limit movement of a stop element arranged in the housing along a stop curve to a predefined region and against a movement cross-wise to the stop curve.

5. The steering column switch unit according to claim 1 wherein the at least one operating lever includes a switching device connected via a connection line and a corresponding plug with an associated connection device in the housing, the corresponding plus being arranged with a predetermined maximum number of connections.

6. The steering column switch unit according to claim 5, wherein the switching device includes at least a one of a switch, an analog control switch, and a potentiometer.

7. The steering column switch unit according to claim 5 wherein the steering column switch unit includes an evaluation unit with a predetermined range of conversion functions adapted to convert signals of the contact device and signals of the switching device into control signals for use by corresponding associated motor vehicle functions.

8. The steering column switch unit according to claim 7, wherein the evaluation unit is hard-wired.

9. The steering column switch unit according to claim 7, wherein the evaluation unit includes electronic logic control with firmware.

10. The steering column switch unit according to claim 7 wherein:
    the housing is adapted to selectively receive said at least one operating lever from among a plurality of operating levers; and,
    the switch unit is adapted to select a conversion function of the evaluation unit by means of an identification information arranged at the installation end of the at least one operating lever and a corresponding identification device arranged in the housing based upon a selectively installed operating lever from among the plurality of operating levers.

11. The steering column switch unit according to claim 10, wherein the identification information and the identification device are formed as a one of a mechanical, and electrical contact and corresponding reverse contact pair.

12. The steering column switch unit according to claim 11 wherein the identification information includes an electronic chip and the identification device includes an electronic scanning device.

13. The steering column switch unit according to claim 1 wherein the contact device and the reverse contact device include at least one of electromechanical contacts and electrical contacts.

14. The steering column switch unit according to claim 13, wherein the electrical contact device includes at least one magnet and the reverse contact device includes at least one Hall-sensor.

15. A modular steering column switch system with selectable switching functions comprising:
    a housing;
    a plurality of interchangable operating levers, each being selectively engagable on a respective installation end with said housing;
    a plurality contact device, each associated with a respective one of the plurality of interchangable operating levers; and,
    a reverse contact device associated with the housing and defining a maximum number of switching functions of the modular steering column switch system, whereby utilized switching functions are selected based on a contact device of the plurality of contact devices associated with a one of the plurality of interchangable operating levers selectively engaged with said housing.

16. The modular steering column switch system according to claim 15 wherein each of the plurality of interchangable operating levers includes a switching device selectively connectable via a connection line and a corresponding plug with an associated connection device in the housing, the corresponding plug being arranged with a predetermined maximum number of connections.

17. The modular steering column switch system according to claim 16 wherein the switching device includes at least a one of a switch, an analog control switch, and a potentiometer.

18. The modular steering column switch system according to claim 16 further including an evaluation unit with a predetermined range of conversion functions adapted to convert signals of the contact and signals of the switching device into control signals for use by corresponding associated motor vehicle functions.

19. The modular steering column switch system according to claim 15 wherein each of the contact devices and the reverse contact device include at least one of electromechanical contacts and electrical contacts.

20. The modular steering column switch system according to claim 19 wherein each of the contact devices includes at least one magnet and the reverse contact device includes at least one Hall-effect sensor.

* * * * *

UNITED STATES PATENT AND TRADEMARK OFFICE
CERTIFICATE OF CORRECTION

PATENT NO. : 6,118,089
DATED : September 12, 2000
INVENTOR(S) : Stewart, et. al.

It is certified that error appears in the above-identified patent and that said Letters Patent is hereby corrected as shown below:

item [30] on the cover page of the patent, delete "Dec. 2, 1997" and insert therefor --Dec. 2, 1996--;

Column 5, line 62, delete "(1)";

Column 6, line 9, delete "plus" and insert therefor --plug--; and

Column 6, line 39, delete "mechanical, and" and insert therefor --mechanical and--.

Signed and Sealed this

First Day of May, 2001

NICHOLAS P. GODICI

*Attest:*

*Attesting Officer*      *Acting Director of the United States Patent and Trademark Office*